United States Patent [19]

Cooke

[11] 3,722,446
[45] Mar. 27, 1973

[54] TORPEDO HOMING SYSTEM

[75] Inventor: David A. Cooke, Kansas City, Mo.

[73] Assignee: The United States of America as represented by the Secretary of the Navy

[22] Filed: July 6, 1956

[21] Appl. No.: 596,366

[52] U.S. Cl. .............................114/23, 114/21, 340/6
[51] Int. Cl. ............................F42b 19/01, G01v 1/00
[58] Field of Search.........244/14; 340/6, 6 R; 114/20, 114/21, 23, 21 R, 21 A, 25; 343/7 ED; 235/61.5 T Primary Examiner—Benjamin A. Borchelt
Assistant Examiner—James M. Hanley
Attorney—V. C. Muller and W. O. Quesenberry

EXEMPLARY CLAIM

1. An active-acoustic-homing torpedo, comprising means for cyclically generating and projecting an acoustic search pulse having short duration relative to the cyclic period, means for receiving and converting a resultant target echo to steering command signals having characteristics which define sense and magnitude of target direction angle as referenced to said torpedo, a steering circuit including a relay having a pair of actuation coils and three-position switch means adapted to be thrown from a normal position to a position dependent upon the sense of differential energization of said coils, means for differentially energizing said coils in accordance with and in response to steering command signals which define a target direction angle exceeding a preselected value, means for effecting a torpedo turn in response to a steering control signal, means for providing a steering control signal of sense corresponding to the position to which said switch means is thrown and adapted to effect reduction of said target direction angle, and means for extending the duration of said control signal beyond that of said echo and terminating upon generation and projection of a following acoustic search pulse.

4 Claims, 6 Drawing Figures

INVENTOR.
DAVID A. COOKE
BY
ATTORNEYS.

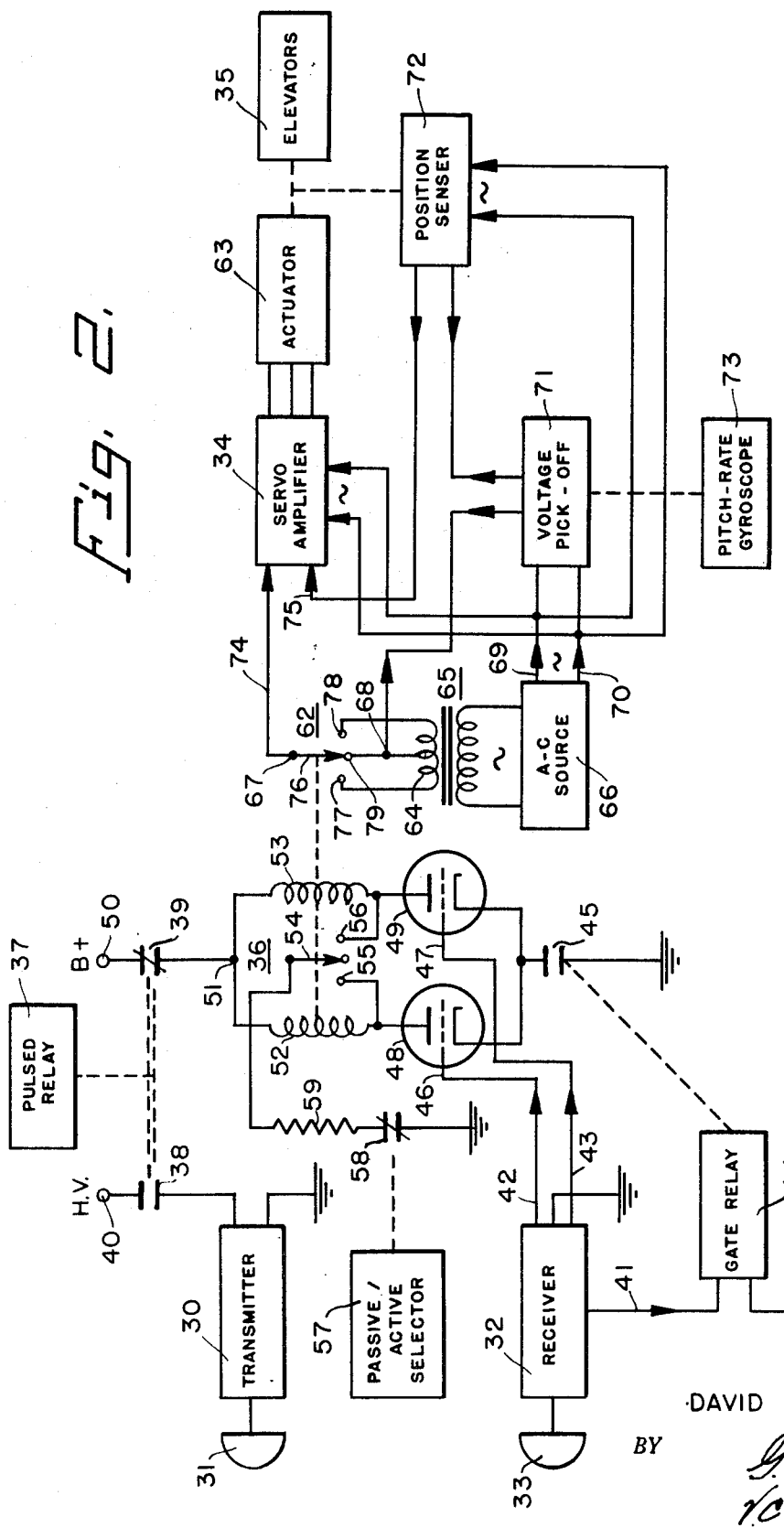

TORPEDO HOMING SYSTEM

This invention relates to torpedoes, and more particularly to automatic steering systems for acoustic-homing torpedoes.

Principally for the purpose of seeking and destroying enemy submarines, acoustic-homing torpedoes have been developed which are generally of either passive or active type. The passive-acoustic type detects, and derives target-direction information from, sonic or ultrasonic noise which arises from the target submarine. The active-acoustic type itself generates and projects sonic or ultrasonic energy, detects resultant target echoes, and from these echoes derives the target-direction information needed for torpedo steering. During a target search phase, the torpedo steering apparatus is generally controlled in accordance with some predetermined plan to effect a sweeping search of an underwater region suspected of encompassing a target submarine. After target detection or acquisition has been established and a target pursuit phase is entered, the torpedo steering is automatically controlled by equipment which makes use of target-direction information as derived from the sonic or ultrasonic disturbance arising from or reflected by the target submarine. Advanced types of homing torpedoes may be capable of both passive and active modes of operation, and adapted to be selectively operated in either mode, or to automatically switch from one to the other as required, during the target detection and target pursuit phases.

In the case of torpedo operation in an active-acoustic mode wherein a pulse-echo principle is employed, the target-direction information available during the pursuit phase is intermittent rather than continuous in character. In a typical practical embodiment, the ultrasonic energy is generated and projected from the torpedo in bursts, often termed "pings," which may have a duration of say 40 milliseconds or less, and a repetition period of say about 1.25 seconds. The resultant target submarine echoes are correspondingly repetitive at substantially the same period. Torpedo steering commands, based upon target-direction information carried by the pulse-echoes as received, may therefore vary considerably from echo to echo, particularly where the target submarine engages in evasive maneuvers. While the torpedo must therefore follow a course which weaves to some extent, the types of steering control employed heretofore have resulted in unduly erratic pursuit courses with corresponding reduction of kill probability.

The present invention is directed in particular toward improving characteristics of the pursuit course followed by a torpedo in its active-acoustic mode of operation, for this purpose providing novel circuitry means as will hereinafter appear. While the invention may be applied to torpedo steering control in both course and depth, the following further remarks and description are made with particular reference to steering control in depth and will suffice to impart a full understanding of the novel concepts and of the operation of practical embodiments which may be employed in implementation thereof.

Earlier acoustic-homing torpedoes of the pulse-echo type employed circuitry and steering control means which, in the target pursuit phase, called for either an up or down deflection of the depth-steering elevators, continuously in each interval measured from a received echo to a succeeding received echo, thus often unnecessarily overcorrecting and in fact at times steering wrongly because of inability to steer a straight-ahead course. Later torpedoes of this type where provided with modified circuitry means which improved the steering control to some extent by calling for either up or down steering only during the repetitive intervals measured from a received target echo to a following ping, allowing the depth-steering elevators to assume a neutral position during the earlier part of the ping cycle. This modified circuitry means, however, still demanded an up or down steer during the interval between a received target echo and the following ping regardless of a possible in-line direction of the target, again permitting false steers to occur.

Accordingly, it is a principal object of the present invention to provide an improved torpedo steering control system.

It is also an object of this invention to provide a torpedo steering control system yielding improved torpedo operation and nevertheless having less complexity than conventional torpedo steering control systems.

A further object of the present invention is to provide a steering control system which is compatible for use in acoustic-homing torpedoes adapted to operate selectively in either a passive or active mode.

Other objects and many of the attendant advantages of this invention will be readily appreciated as the same becomes better understood by reference to the following detailed description when considered in connection with the accompanying drawings wherein:

FIG. 2 is a schematic circuit, partly in block diagram form, of an examplary embodiment of the present invention.

Figure 1:
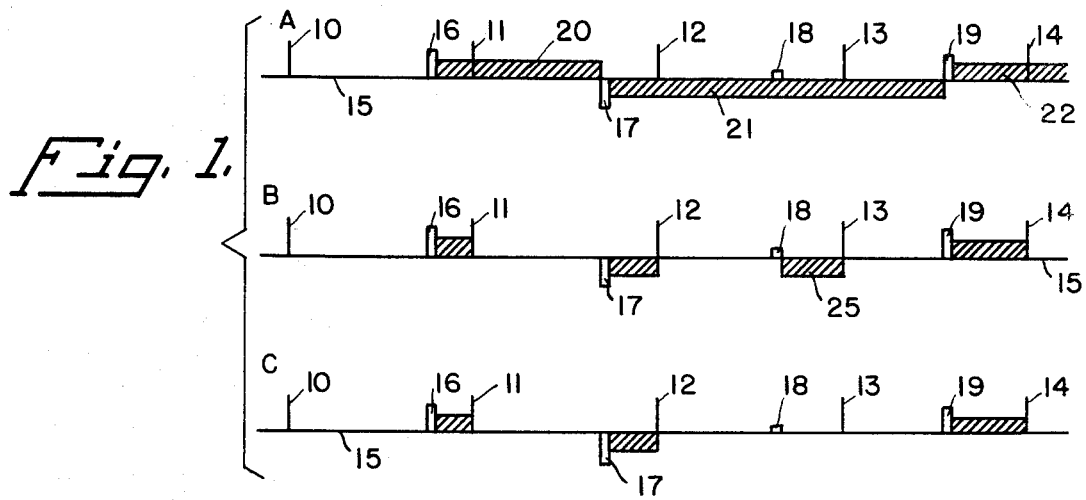
FIGS. 1A and 1B are diagrams representing earlier types of steering control commands as provided and utilized in the pursuit phase of certain active-acoustic homing torpedoes.
FIG. 1C is a similar diagram representing steering control commands as provided and utilized by the novel torpedo steering system here disclosed.

First referring to FIG. 1, diagrams A, B and C each chart the time relationship of transmitted pings, of steering command signals derived from target echoes which as received have direction-dependent characteristics, and of steering command intervals and characteristics, for three different types of torpedo steering systems. For comparison purposes, the diagrams are drawn to the same time base and pose the same ping-echo conditions. Diagram A represents typical conditions characterizing an early type of steering system employed by pulse-echo homing torpedoes in which, after target acquisition and during target pursuit, steering either up or down in depth takes place during each interval extending from a target echo to a succeeding target echo. The pings 10 to 14 are shown positioned along the time base 15 at points representing transmission instants, and the resultant up and down steering command signals 16 to 19 are shown at points representing echo reception instants.

It is to be understood that as represented in diagrams A, B and C of FIG. 1, steering command signals 16 to 19 are shown as extending up or down, relative to time base 15, corresponding to the up or down target direction information as later derived from the received target echoes, and resulting in corresponding deflection of the depth-steering elevators, as indicated by the cross-hatched areas, to nose the torpedo in the up or down target direction.

Again referring to diagram A, and assuming that target acquisition has not yet been established at the beginning of the illustrated series of pings 10 to 14, reception of the first target echo initiates the pursuit phase and accordingly causes operation of the depth-steering elevators to nose the torpedo up in accordance with the up characteristic of the steering command signal 16 and as indicated by the cross-hatched area 20. The torpedo will continue to turn upwardly, as mentioned previously, until reception of the next target echo which in this instance arises by reflection from the target then having a down direction relative to the torpedo, as indicated by steering command signal 17. At this time, then, the torpedo reverses from an upward turn to a downward turn as indicated by the cross-hatched area 21, maintaining this downward direction of turn until reception of the next target echo which in this instance yields a steering command signal 18 of insufficient amplitude to affect control of the steering apparatus. For such a condition, then, the previous downward turn of the torpedo will continue, as shown, until the relative target direction is effective to yield an up-steering command signal 19 of controlling magnitude, as indicated by the upwardly extending cross-hatched area 22.

A later type of steering system, provided by modification of the circuitry means which has been employed for the steering action illustrated in diagram A of FIG. 1, limited the steering control to the periods between an echo and a following ping, as indicated in the diagram B which will now be fully understood without further explanation in view of the preceding discussion concerning diagram A. It should be noted, however, that as the torpedo nears the target, the steering periods between a target echo and a following ping become greater and thus the torpedo hydrodynamic characteristics have progressively less effect in limiting the turn rate which can be attained. While thus yielding considerable improvement as to relative rates of turn which obtain during initial and terminal phases of target pursuit, (most pursuit courses require a higher rate of turn as the torpedo nears the target, for best kill probability), the said later type of steering system still demanded that the torpedo execute an up or down turn, indeterminately, despite a nearly in-line direction of the target, as indicated in diagram B by the up-steering command signal 18 of non-controlling amplitude and the ensuing steering control interval 25 during which a down turn as shown may occur.

The type of steering control action resulting from use of the present invention is illustrated in diagram C of FIG. 1, much the same as described with reference to diagram B but with the important distinction that the torpedo in this instance steers neither up nor down following reception of an echo from a target nearly in-line with the target, as indicated in diagram C by absence of up or down steering control following the low-amplitude up-steering command signal 18.

FIG. 2 illustrates, partly in block diagram form as to conventional units of the torpedo system, schematic circuitry of a typical embodiment of the present invention which provides the type of steering control described above with reference to diagram C of FIG. 1. First considering FIG. 2 generally, the exemplary embodiment there shown comprises a transmitter 30 which energizes electro-acoustic transducer 31 to project bursts of ultrasonic energy, a receiver 32 and associated circuitry which derives target and steering signals (later defined) from target echoes as received by electro-acoustic transducer 33, steering equipment including a servo-amplifier 34 and associated units for effecting suitably servoed deflections of depth-steering elevators 35, and a three-position steering control relay 36 which is actuated by the steering signals and by associated circuitry, a will appear, and which correspondingly controls the steering equipment.

It is to be understood, of course, that the circuitry here shown represents that which obtains during the pursuit phase of the torpedo as a result of automatic switching or re-circuiting action (by means forming no part of the present invention, therefore not shown) caused by target acquisition. It is also to be understood that relay contact conditions are shown in FIG. 2 as they occur during the interval between transmission of a ping and reception of a resultant echo.

Referring now in detail to the system shown in FIG. 2, pulsed relay 37 may be operated by conventional timing switch means to close relay contacts 38 (and to open relay contacts 39) for periods of say 40 milliseconds or less duration, and at intervals of say 1.25 seconds, causing the high voltage (H.V.) supplied to terminal 40 to be intermittently applied to transmitter 30 and to thus produce and project underwater ultrasonic pings of like duration and repetition interval. Since the torpedo, having acquired the target, is trained in at least the general direction of the target, and during pursuit does not swerve greatly from the target direction, and because the field patterns of transducers 31 and 33 are sufficiently wide to in effect continuously "see" the target under such conditions, the projected bursts of ultrasonic energy repetitively impinge upon the target submarine and are reflected therefrom as echoes which are received and sensed by transducer 33. These target echoes may be operated upon by conventional means within receiver 32 to provide target signals at lead 41 and steering signals at leads 42, 43. The target signals applied to gate relay 44 are d-c pulses having substantially the same duration and repetition characteristics as the projected pings, and during pursuit are normally of sufficient amplitude to energize gate relay 44, repetitively, at substantially the instants of echo reception. Gate relay contacts 45 are therefore closed during reception of an echo, but open before and after reception of the echo. The corresponding steering signals are also substantially in time-coincidence with echo-reception, and are supplied as d-c pulses of say positive polarity by receiver 32 via either lead 42 or 43, depending upon whether the echo arrives from an up-target or a down-target, to control grid 46 or 47 of steering relay tube 48 or 49, respectively. The tubes 48, 49 are of course to be understood as either requiring no initial bias, or suitably biased in conventional manner to normally limit their plate-circuit currents to satisfactory quiescent level, As already mentioned, pulsed relay contact 39 is closed during the interval between pings, thus communicating the plate voltage (B+), supplied to terminal 50, to junction 51 of relay coils 52, 53. At the instant of echo reception, the plate-voltage circuit is completed through closed gate relay contact 45, enabling the steering control relay circuit to react to the steering signal delivered thereto by receiver 32, via lead 42 or 43 as mentioned above. Swinger contact 54 will accordingly move into engagement with either contact 55 or 56, dependent on whether the received echo arrives from an up or down target.

Swinger contact 54 is maintained in that position, against contact 55 or 56 as the case may be, until the end of the ping cycle by action of a holding circuit forming a part of passive/active selector 57. Passive/active selector 57 includes a relay (not shown) which, when the torpedo operates in the active-acoustic mode as here contemplated, is either preset before torpedo launching, or automatically controlled (by means not shown) to close contacts 58 as illustrated. Swinger contact 54 having moved into engagement with either contact 55 or 56 because of increased current through either coil 52 or 53, respectively, as effected by steering signal action, closed contact 58 serves as auxiliary means to complete the d-c circuit and to thus maintain the current through that coil after termination of the relatively short period of the steering signal and during the remainder of the ping cycle. Resistor 59 serves to limit the current under such condition, but to a value sufficient to maintain the swinger contact 54 against the up or down contact 55, 56. Passive/active selectOr relay contact 58 and series resistor 59 thus serve as part of an auxiliary holding circuit which, of course, can be effective to maintain swinger contact 54 in engagement with the up or down contact, as the case may be, only until circuit continuity is broken by opening of pulsed relay contact 39 at the next pinging instant. A typical sequence of operation will later be described in detail.

The remaining torpedo steering equipment is basically a depth-steering elevator actuating apparatus, which may be of any type, operated in accordance with up or down steering control signals as applied through a voltage-reversing switch means 62. In the particular servoed arrangement here shown, the torpedo depth-steering elevators 35 are positioned by an actuator 63 which is controlled by servo-amplifier 34.

The steering control signals are obtained from the center-tapped secondary 64 of transformer 65 which is energized by a-c source 66. Switch means 62 is operated by steering control relay 36 in unison with switching movement of swinger contact 54, as indicated. For the illustrated connections, then, the steering control signals delivered to terminal 67 relative to terminal 68, for an up-target echo, will be in say phase-agreement with respect to a reference voltage, and in phase-opposition for a down-target echo. Since the a-c source 66 energizes the transformer 65 from which the steering control signals are obtained, the same source also conveniently serves, as shown, to supply reference voltage via leads 69, 70 to servo-amplifier 34, voltage pick-off means 71, and elevator position-sensing means 72. The same a-c source may of course also be employed to energize the servo-amplifier 34 and other units as required.

As will now be understood, he steering control signals are intermittent but of appreciable individual durations which increase as the target submarine is approached, as illustrated in FIG. 1C. The steering control signals, modified by summation with elevator-position and torpedo pitch-rate signals delivered, respectively, by position sensor 72 and by the voltage pick-off means 71 associated with pitch-rate gyroscope 73, as indicated, are applied via leads 74, 75 to the servo-amplifier 34. Servo-amplifier 34 thus correspondingly controls the torpedo depth-steering elevators 35 through actuator 63 to steer the torpedo upwardly or downwardly as required to intercept the target submarine. The elevator position and torpedo pitch-rate signals serve to so modify the steering control signals as to limit the turning rate in depth to some predetermined maximum value and to provide stabilized optimum elevator-deflection characteristics, in accordance with known practice. It may also be noted at this point that when swinger contact 76 moves to a central position out of engagement with contacts 77 and 78, the arrangement operates to maintain the torpedo climb or dive angle at substantially the value previously acquired during an upward or downward turn.

Figures 3, 4, 5:
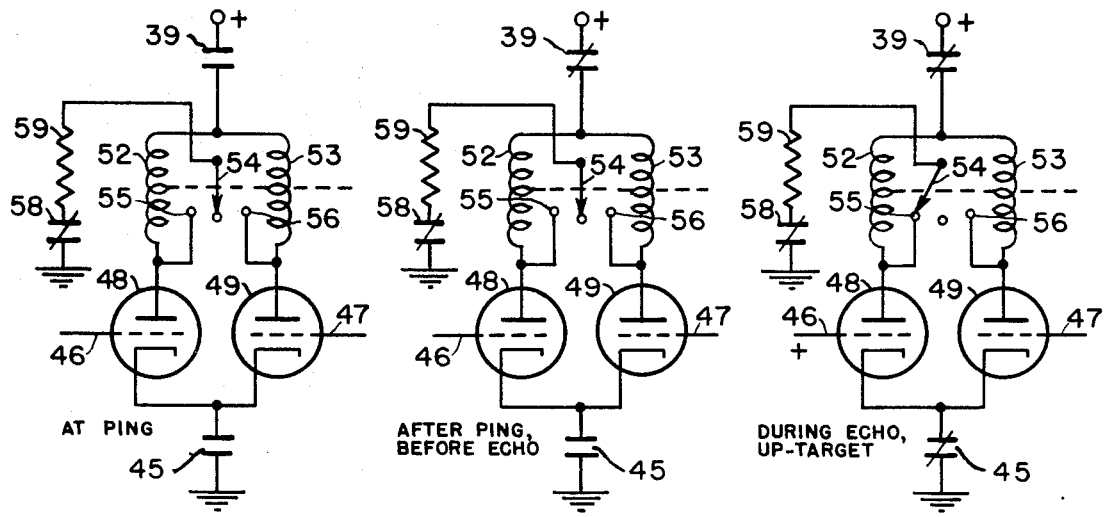
FIGS. 3, 4, 5 and 6 are schematic partial circuits of the novel steering control system illustrated in FIG. 2 but here shown in sequential stages of operation.
Figure 6:
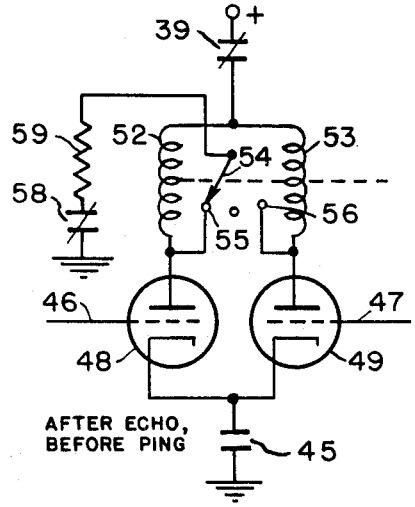

Returning now to consideration of sequential conditions in the steering relay circuit, FIG. 3 illustrates the circuit condition during the ping period of say 40 milliseconds as previously mentioned. Pulsed relay contact 39 is open during this time, breaking continuity of the holding circuit (the circuit including closed selector relay contact 58) even is previously established, and thus insuring that swinger contact 54 is returned to a central position as shown. Immediately after the ping, and as illustrated in FIG. 4, pulsed relay contact 39 again closes, placing the circuit is readiness to be responsive to a steering signal applied to the control grid of either tube 48 or 49, as the case may be. FIG. 5 illustrates the circuit conditions during reception of a target echo having sufficient magnitude to effect closing of gate relay contact 45, and arriving from say an up-target and therefore resulting in application of a steering signal to control grid 46 of tube 48 as indicated. As already described, relay coil 52 then becomes energized to a greater extent than relay coil 53 and correspondingly causes movement of swinger contact 54 into engagement with up-contact 55. As illustrated in FIG. 6, swinger contact 54 will be maintained in this condition until the next ping, despite the fact that termination of the target signal has opened gate relay contact 45, since relay coil 52 will continue to be energized to a greater extent than relay coil 53 by action of the holding circuit. Similarly, a target echo arriving from a down-target will effect switching action of swinger contact 54 to contact 56. A target echo of insufficient magnitude to effect closing of gate relay contact 45, or arriving from a target submarine so nearly in line with the torpedo as to yield a steering signal of insufficient amplitude to sufficiently unbalance the coil currents of steering relay 36, will allow swinger contact 54 to remain centered out of engagement with either contact 55, 56.

It will be understood, of course, that the switching movements of swinger contact 54, obtained as a result of sequential conditions as above described, are duplicated exactly by the voltage-reversing switch means 62 which controls the steering command signals, as shown in FIG. 2. The above-described system thus operates to provide the improved type of steering control illustrated diagrammatically in FIG. 1C wherein steering control is effected, during the intervals extending from a received target echo to the following transmission of a ping, in full accordance with that necessary to achieve interception of the target.

Also, as previously indicated, the above-described circuitry accomplishes simple switch-over to torpedo operation in a passive-acoustic mode. Referring again to FIG. 2, it should be understood that pulsed relay 37 is taken out of action to accommodate such operation, and that at this time passive/active selector 57 is controlled to open the holding contact 58. During operation in this listening mode, pulsed relay contact 39 remains closed and selector relay contact 58 remains open. The steering control relay circuit then functions as an ordinary three-positions control circuit, responsive to target signals and steering signals, as derived by the receiver from target submarine noise signals as received, to provide up, down and straight-ahead steering of the torpedo as called for by the steering signals.

While the exemplary embodiment given herein employs a steering control tube/relay circuit shown as having applied thereto a unipolar steering command signal via either lead 42 or 43 dependent upon target direction as derived from received echoes, nd the steering control tube/relay circuit is correspondingly arranged to be responsive to such signals, as detailed above, it should be understood that the novel steering control concept disclosed herein may be embodied in other systems having receiver equipment which delivers steering command signals of different character to a steering relay circuit correspondingly adapted to be responsive to such signals but otherwise functioning in basically the same manner. For example, the receiving equipment may be designed to operate upon a target echo in such manner as to supply, simultaneously to the grids 46, 47 of steering control relay tubes 48, 49 via leads 42 and 43, a modulation signal having amplitude and phase characteristics which, relative to a reference signal provided by the receiver equipment, define the magnitude and sense, respectively, of the target direction relative to the torpedo. In this instance, of course, the modulation signal would be of duration substantially equal to that of the received echo, and of frequency considerably less than the carrier frequency of the received echo. Correspondingly, the tubes 48, 49 would then be arranged to function as phase-sensitive detectors by additional application thereto of oppositely-phased reference signals, resulting in command signals and energization of relay coils 52, 53 by currents of effectively the same character and general relationship as already described. The basic functioning of the steering control relay circuit remains the same as regards the manner of avoiding production of up or down steering action when the steering command signal amplitude, in this case the modulation signal amplitude, corresponding to the extent of relative deviation of target direction, fails to exceed a predetermined threshold value.

Obviously many modifications and variations of the present invention are thus possible in the light of the above teachings. It is therefore to be understood that within the scope of the appended claims the invention may be practiced otherwise than as specifically described.

What is claimed is:

1. An active-acoustic-homing torpedo, comprising means for cyclically generating and projecting an acoustic search pulse having short duration relative to the cyclic period, means for receiving and converting a resultant target echo to steering command signals having characteristics which define sense and magnitude of target direction angle as referenced to said torpedo, a steering circuit including a relay having a pair of actuation coils and three-position switch means adapted to be thrown from a normal position to a position dependent upon the sense of differential energization of said coils, means for differentially energizing said coils in accordance with and in response to steering command signals which define a target direction angle exceeding a preselected value, means for effecting a torpedo turn in response to a steering control signal, means for providing a steering control signal of sense corresponding to the position to which said switch means is thrown and adapted to effect reduction of said target direction angle, and means for extending the duration of said control signal beyond that of said echo and terminating upon generation and projection of a following acoustic search pulse.

2. An active-acoustic-homing torpedo, comprising means for cyclically generating and projecting an acoustic search pulse having short duration relative to the cyclic period, means for receiving and converting a resultant target echo to steering command signals having characteristics which define sense and magnitude of target direction angle as referenced to aid torpedo, a steering circuit including a relay having a pair of actuation coils and three-position switch means adapted to be thrown from a normal position to a position dependent upon the sense of differential energization of said coils, first switch means normally closed and adapted to open only during the period of generation and projection of an acoustic search pulse, second switch means normally open and adapted to close only during reception of a resultant target echo, means including said first and second switch means in closed condition for differentially energizing said coils, during reception of a target echo, in accordance with and in response to steering command signals which define a target direction angle exceeding a preselected value, means for effecting a torpedo turn in response to a steering control signal, means for providing a steering control signal of sense corresponding to the position to which said switch means is thrown and adapted to effect reduction of said target direction angle, and a holding circuit including said three-position switch means and said first switch means for maintaining said differential energization of said coils for a period extending beyond that of said echo and terminating upon generation and projection of a following acoustic search pulse.

3. A course-controlling system for an active-acoustic-homing torpedo having means for cyclically generating and projecting an acoustic search pulse having short duration relative to the cyclic period, means for receiving and converting a resultant target echo to steering command signals having characteristics which define sense and magnitude of target direction angle as referenced to said torpedo, and means for effecting a torpedo turn in response to a steering control signal, said system comprising a steering circuit including a relay having a pair of actuation coils and three-position switch means adapted to be thrown from a normal position to a position dependent upon the sense of differential energization of said coils, means for differentially energizing said coils in accordance with and in response to steering command signals which define a target direction angle exceeding a preselected value means for providing a steering control signal of sense corresponding to the position to which said switch means is thrown and adapted to effect reduction of said target direction angle, and means for extending the duration of said control signal beyond that of said echo and terminating upon generation and projection of a following acoustic search pulse.

4. A course-controlling system for an active-acoustic-homing torpedo having means for cyclically generating and projecting an acoustic search pulse having short duration relative to the cyclic period, means for receiving and converting a resultant target echo to steering command signals having characteristics which define sense and magnitude of target direction angle as referenced to said torpedo, and means for effecting a torpedo turn in response to a steering control signal, said system comprising a steering circuit including a relay having a pair of actuation coils and three-position switch means adapted to be thrown from a normal position to a position dependent upon the sense of differential energization of said coils, first switch means normally closed and adapted to open only during the period of generation and projection of an acoustic search pulse, second switch means normally open and adapted to close only during reception of a resultant target echo, means including said first and second switch means in closed condition for differentially energizing said coils, during reception of a target echo, in accordance with and in response to steering command signals which define a target direction angle exceeding a preselected value, means for providing a steering control signal of sense corresponding to the position to which said switch means is thrown and adapted to effect reduction of said target direction angle, and a holding circuit including said three-position switch means and said first switch means for maintaining said differential energization of said coils for a period extending beyond that to said echo and terminating upon generation and projection of a following acoustic search pulse.

* * * * *